Dec. 27, 1932.                  C. P. DUBBS                    1,892,452
                    PROCESS FOR CRACKING HYDROCARBON OIL
                           Filed Jan. 12, 1922
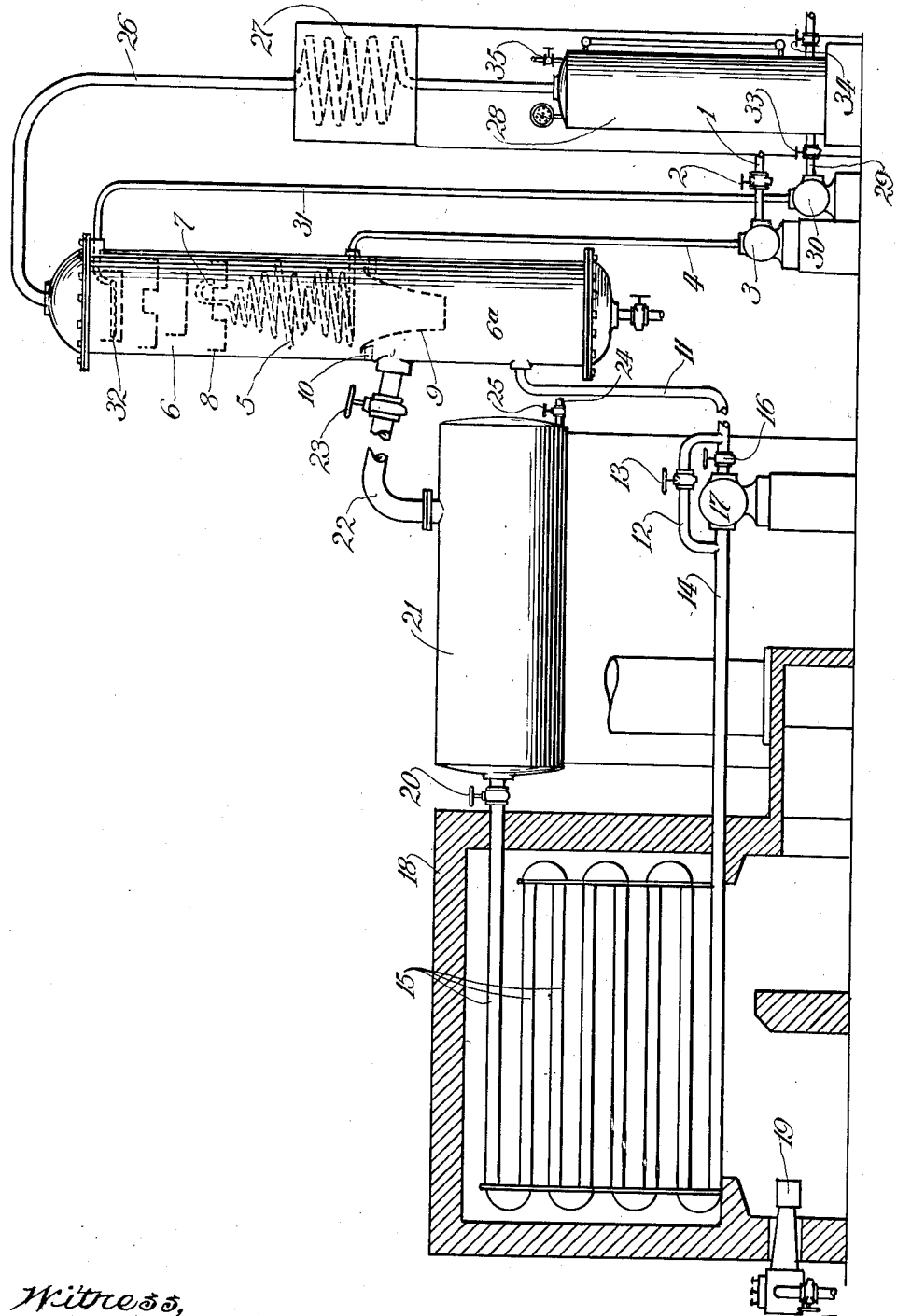
Witness,
S. D. Mann
Inventor,
Carbon P. Dubbs
By Frank C. Belknap, Atty.

Patented Dec. 27, 1932

1,892,452

UNITED STATES PATENT OFFICE

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA

PROCESS FOR CRACKING HYDROCARBON OIL

Application filed January 12, 1922. Serial No. 528,793.

This invention relates to a process for cracking hydrocarbon oils and refers more particularly to a process for converting relatively heavy or high boiling point oils into oils having a lower boiling point, and having the characteristics of gasoline or the like.

The important objects of the invention concern the preheating of the raw oil and dephlegmation of the vapors in the refluxing zone.

The single figure is a diagrammatic side elevational view of the apparatus.

Referring to the drawing, the oil to be treated is introduced from any convenient source through the line 1 controlled by a valve 2 and is charged by means of the pump 3 through the vertical line 4 into a coil 5 positioned centrally in the dephlegmator or refluxing tower 6. The coil terminates in an open end 7 positioned to discharge the oil into the lower pan 8 of the series of pans which are positioned in the upper part of the column. The oil, as it travels through the coil 5, is subjected to the preheating action of the vapors which rise through the dephlegmator, and as it is comparatively cool, it serves as a dephlegmating medium to the vapors as they rise through the tower. Any water that may be contained in the oil will be vaporized and will be discharged into the top of the tower to be carried over with the dephlegmated vapors to the final condenser and receiver. This separating out of any water which may be in the oil is an important factor, as difficulty is experienced often times when water or water vapor collects in the system causing unnatural expansion and a dangerous factor where it is present with such high temperature. The heated oil after being discharged into the lower pan, will overflow this pan and percolate through the perforations in the bottom of the pan, thence coming in intimate contact with the rising vapors and collecting in the bottom leg of the dephlegmator 6a with what condensate it may separate from the vapors during dephlegmation.

A funnel shaped element 9 supported by lugs 10 serves to drain the oil and condensate into the lower leg and at the same time keep separate the vapors which are introduced just below the preheating coil 5. The oil after collecting in the bottom of the dephlegmator is drawn off through the line 11 and may be charged through the bypass line 12 controlled by a valve 13 by gravity to the line 14 and heating tubes 15, or by closing the valve 13 and opening the valve 16 the oil may be charged by means of the pump 17 to the heating coils 15 through the line 14. The coils are mounted in a furnace 18 which is preferably heated by means of gas burners 19. In the furnace the oil is raised to a conversion temperature, is then directed through the transfer line controlled by a valve 20 to the vaporizing chamber 21 where vaporization takes place, the evolved vapors passing off through the vapor line 22 controlled by a valve 23 to be introduced to the dephlegmator, and the unvaporized portion being maintained at a level in the chamber by means of the draw-off line 24 controlled by a valve 25.

As explained, the vapors rising in the dephlegmator are first subjected to the refluxing action of the cool raw oil and to intimate contact with the preheated oil as it percolates down from the lower pan of the dephlegmator. In this zone of the dephlegmator there is separated out a considerable portion of the higher boiling point fractions, and due to the fact that this refluxing action takes place immediately on the introduction of the vapors to the dephlegmator, the velocity at which the vapors rise is materially lessened.

As the vapors rise above the lower pan 8 they are further treated by coming in contact with a further refluxing medium in the form of returned distillate from the receiver. This distillate, constituting the vapors which are condensed after passing over through the line 26 and through the condensing coil 27, is returned from the receiver 28 through the draw-line 29, pump 30 and vertical return line 31 which terminates in the top of the dephlegmator in the form of a circular spray pipe 32. This spray pipe is positioned to introduce the return distillate in the top pan of the dephlegmator whereby the distillate is caused to percolate down through the successive pans and combine with the raw oil in the lower pan 8, and collecting with the raw oil and reflux separated out in the dephlegmating column in the bottom of the tower to be withdrawn and retreated with these oils. The amount of distillate returned in this manner may be regulated by the valve 33 in the line 29. As desired, the distillate may be drawn off through the valve 34. The process is preferably operated continuously and a pressure of the generated vapors maintained upon the apparatus during operation by manipulation of the pressure relief valve 35 on the receiver and other valves positioned in different stages of the system. The efficiency of a dephlegmator is more or less governed by the velocity of the vapors that travel therethrough. If this velocity exceeds a certain speed it will result in carrying over to the condenser and receiver, more or less of the refluxing or cooling medium which is introduced into the top of the column, in most cases this being the raw oil. By carrying over this raw product with more or less of the condensate which should be separated out in the dephlegmating stage, the object of the dephlegmating operation is to a great extent defeated. In the present process by introducing the cool raw oil into the dephlegmating stage at a point relatively close to the zone where the incoming vapors are introduced, it brings the coolest oil in that part of the dephlegmator which contains the hottest vapors, resulting in a very rapid rate of cooling. The condensing at this portion of the dephlegmator will therefore, be considerable, and greatly reduce the volume of vapors which results in reducing the rate of travel or velocity of the uncondensed vapors through the dephlegmator. This will in effect greatly increase the capacity of the dephlegmator as compared with the type of dephlegmator in which the cool raw oil is pumped into the top or central part of the column.

A further advantage in pumping the raw oil into a coil in the manner shown, is the fact that the raw oil is in conductive contact with the hottest vapors and any normal amount of water contained in the raw oil will be generated into steam as it passes through the coil, being discharged in the middle of the dephlegmator in the form of steam, thereby preventing the heaves caused by the vaporization of water collecting in the bottom of the dephlegmator when the oil is introduced in the usual manner.

I claim as my invention:

1. A process for cracking hydrocarbon oils, consisting in simultaneously preheating the oil and dephlegmating the oil vapors by introducing the oil to be treated into a coil having imperforate side walls extending through the hottest portion of the dephlegmating stage, discharging the oil from the coil into a portion of the dephlegmating stage above the inlet of said coil and permitting the preheated oil to come in intimate contact with the vapors rising through said dephlegmating stage, drawing off the oil and condensate from the dephlegmating stage and subjecting them to a cracking temperature in a heating zone, passing the heated oil to a vaporizing stage, subjecting the vapors evolved therein to dephlegmating and condensing actions and withdrawing the unvaporized oil from the vaporizing stage, and maintaining a regulated vapor pressure upon the system.

2. A process for cracking hydrocarbon oils, consisting in introducing the oil and circulating it a considerable distance in heat conductive relation to but out of physical contact with the vapors in a dephlegmating stage, discharging the preheated oil after such circulation into a portion of the dephlegmating stage above the point at which it was introduced thereto and permitting it to come into intimate contact with the vapors rising therein, drawing off the oil from the dephlegmating stage and charging it to a heating zone and there subjecting it to a conversion temperature, passing the heated oil to a vaporizing stage and subjecting the evolved vapors to dephlegmating and condensing action, returning regulated portions of the distillate produced from condensation of the dephlegmated vapors to the dephlegmating stage, and maintaining a regulated vapor pressure upon the oil during treatment in the dephlegmating stage.

3. A method of dephlegmating oil vapors evolved in an oil cracking process, consisting in introducing the vapors to a dephlegmating tower, to travel therethrough, in simultaneously introducing a stream of charging oil for the cracking process to the dephlegmating tower at a point adjacent the vapor inlet thereto, in causing said stream of oil to flow in the same direction as the vapors, but out of physical contact therewith, for a substantial distance, in then introducing the stream of charging oil into physical contact with the vapors at a point a substantial distance from the vapor outlet from the dephlegmating tower, and in maintaining a superatmospheric pressure on the vapors undergoing dephlegmation.

4. A method of dephlegmating oil vapors evolved from oil subjected to cracking conditions of temperature and pressure, consisting in introducing the vapors to a dephlegmating column, in initially lowering the velocity of the vapors in the dephlegmating column by initially introducing thereto at a point adjacent the vapor inlet thereof a confined stream of charging oil, to flow for a substantial portion of the travel of the vapors in heat conductive relation to but out of physical contact with the vapors, in subjecting the vapors, during the remaining portion of their travel through the dephlegmating column, to the refluxing action of an oil of lower boiling point than the condensate separated from the vapors during dephlegmation, and in maintaining a superatmospheric pressure on the vapors undergoing dephlegmation.

5. A method for dephlegmating cracked hydrocarbon vapors for the separation of insufficiently cracked fractions thereof from the sufficiently cracked fractions comprising introducing the vapors to a dephlegmating column, simultaneously causing a stream of cool oil to initially flow through the dephlegmating column adjacent the point of admission of vapors thereto, causing the vapors to thereafter flow through a portion of said dephlegmating column out of heat interchange relation with said cool oil, taking off the completely dephlegmated and sufficiently cracked vapors from said dephlegmating column and finally condensing the same as the final product of the process, returning portions of said final product to that portion of the dephlegmating column wherein the vapors are out of heat interchange relation with the cool oil and subjecting the vapors in said last mentioned portion of the dephlegmating column to physical contact with said product.

CARBON P. DUBBS.